United States Patent [19]

Cunningham

[11] Patent Number: 5,488,524

[45] Date of Patent: Jan. 30, 1996

[54] SELF ADAPTIVE HEAD FOR SEMI-CONTACT RECORDING

[75] Inventor: Earl A. Cunningham, Rochester, Minn.

[73] Assignee: International Business Machines Corporation, Armonk, N.Y.

[21] Appl. No.: 172,683

[22] Filed: Dec. 21, 1993

[51] Int. Cl.[6] .............................. G11B 21/21; G11B 5/60
[52] U.S. Cl. ................................. 360/103; 360/104
[58] Field of Search .................................. 360/102–104, 360/125, 126

[56] References Cited

U.S. PATENT DOCUMENTS

| | | | |
|---|---|---|---|
| 4,251,841 | 2/1981 | Jacobs | 360/122 |
| 4,555,739 | 11/1985 | Le Van et al. | 360/103 |
| 4,646,180 | 2/1987 | Ohtsubo | 360/103 |
| 4,777,544 | 10/1988 | Brown et al. | 360/75 |
| 4,894,740 | 1/1990 | Chhabra et al. | 360/103 |
| 4,926,274 | 5/1990 | Saitoh et al. | 360/102 |
| 4,931,887 | 6/1990 | Hegde et al. | 360/75 |
| 4,961,121 | 10/1990 | Astheimer et al. | 360/103 |
| 5,021,906 | 6/1991 | Chang et al. | 360/103 |
| 5,072,322 | 12/1991 | Yasar et al. | 360/103 |
| 5,175,658 | 12/1992 | Chang et al. | 360/103 |
| 5,212,608 | 5/1993 | Yoneoka | 360/103 |
| 5,218,494 | 6/1993 | Chapin et al. | 360/103 |
| 5,287,235 | 2/1994 | Cunningham et al. | 360/103 |
| 5,343,343 | 8/1994 | Chapin | 360/103 |
| 5,359,480 | 10/1994 | Nepela et al. | 360/103 |

FOREIGN PATENT DOCUMENTS 4-319585  11/1992  Japan ..................................... 360/103

OTHER PUBLICATIONS

IBM Technical Disclosure Bulletin, vol. 22, No. 4, Sep. 1979, entitled: "Flexible Disk and Self-Adaptive Head Combination" by A. J. Bowen and E. A. Cunningham.

*Primary Examiner*—Stuart S. Levy
*Assistant Examiner*—Jefferson Evans
*Attorney, Agent, or Firm*—Carl W. Laumann; Richard E. Billion; Shawn B. Dempster

[57] ABSTRACT

A disk drive slider is designed to make contact, if any, in a region of the slider which does not have a substantial effect on the fly height. Preferably, the slider utilizes a tapered center rail having a narrow tail which is closest to the disk and a pair of outside rails which are wider at the leading edge. The center rail tapers from a narrow leading edge to a wider support region and then tapers to a narrow trailing edge. The trailing edge is closest to the disk and provides virtually no contribution to aerodynamic support of the slider. Since the trailing edge does not contribute to the support of the slider, any contact induced wear can be tolerated without affecting the fly height. Even further, the wear characteristic is self-limiting. That is, after the initial wear has taken place, the likelihood of further wear is reduced.

13 Claims, 6 Drawing Sheets

SELF ADAPTIVE HEAD FOR SEMI-CONTACT RECORDING

FIELD OF THE INVENTION

This invention relates to magnetic disk drive storage devices, and in particular to the design of an air bearing slider magnetic transducer head of a magnetic disk drive.

BACKGROUND OF THE INVENTION

In a magnetic storage system utilizing hard disks, the recording density, and therefore the ultimate data storage capacity of a disk, is determined by a number of factors including the thickness of the recording media and the characteristics of the magnetic transducer which interacts with the disk to read and write data. One of the more significant characteristics of the transducer is the operating height (distance) from the disk. Positioning the transducer closer to the disk allows denser recording. While a transducer in continuous direct contact with the disk would theoretically allow the highest density recording, such an approach is undesirable from the practical standpoint since the transducer or the magnetic coating on the surface of the hard disk would rapidly wear to the point of inoperability.

If, on the other hand, a system is designed in which the transducer touches the disk for only short periods of time and then only during start up and stop operations when the disk is rotating relatively slowly, wear is reduced but recording density is sacrificed.

Various slider designs have been devised to permit operation of the slider in ever closer proximity to the surface of the disk. Improvements in slider aerodynamics have led to increased stability and "stiffness" but the necessity for avoiding high speed contact with the surface of the disk requires a safety factor in the flying height. For this reason, the ultimate performance of a given slider design can never be realized.

While some contact with the disk can be tolerated without substantially increasing the possibility of system failure, the performance of existing slider designs is such that any contact induced wear causes a decrease in the fly height which results in more contact with the disk and a rapid further increase in the wear. In other words, the wear induced changes in slider performance operate to change the slider performance in a way to accelerate wear in a fashion which leads to premature failure of the storage system.

The common bi-rail taper-flat air bearing slider configuration used for thin-film or ferrite heads is designed to fly without contacting the disk except at start-up and shutdown, when the disk is operating at reduced speed. If the head design is altered to reduce the fly height to the point where occasional contact is made when the disk is at operating speed, the head will wear at the back end (trailing edge). As a consequence of the wear, the fly height is reduced and the head wears more. This process continues until the head to disk contact reaches the point where destruction of the head and/or the disk surface occurs.

In the common type of slider, the pressure on the back of the rails is normally higher than the pressure further forward since the air is compressed proportionally more at the back of the slider than near the middle of the slider. As the air under the rails is compressed, some loss of pressure occurs due to leakage out from under the sides of the rails, tending to reduce the pressure increase near the back of the rails. If, by reason of wear due to contact with the disk, the rear portion of the rails become flat (parallel) to the disk surface, there is no further pressure increase under the back of the rails. The air under the slider is compressed as it moves to the rear of the slider since the rails are closer to the disk at the rear of the slider. However, when the rear position of the rails becomes worn and lies parallel to the surface of the disk, there is no further compression and no resulting pressure increase. In fact, due to the air which leaks out from the sides of the rail, there is a drop in pressure near the back of the slider. The drop in pressure at the rear has two adverse effects. First, the reduced pressure at the rear of the slider reduces the support for the slider in the region near the back of the slider causing it to fly closer to the disk and accelerate wear. Secondly, there is no attendant decrease in pressure at the front of the slider so there is a tendency for the slider to pitch upward, which, after some wear has occurred, also causes the back of the slider to move closer to the disk surface. Since the two dominant effects of wear both tend to move the rear of the slider closer to the disk and this in turn causes even more wear, the process accelerates until destruction.

SUMMARY OF THE INVENTION

It is an object of this invention to provide an enhanced magnetic disk drive.

It is another object of this invention to provide an enhanced transducer head for a magnetic disk drive.

It is another object of this invention to increase the tolerance of an air bearing slider to contact with the surface of a magnetic disk without a substantial decrease in fly height.

It is another object of this invention to provide an improved slider which accommodates wear caused by disk contact without a substantial decrease in fly height.

It is another object of this invention to increase the reliability of a magnetic disk drive.

It is another object of this invention is to provide a slider in which initial wear caused by disk contact alters the operating characteristics of the slider to reduce further wear.

It is another object of this invention is to provide a slider in which the wear is self limiting instead of accelerating to destruction.

According to this invention, a disk drive slider is designed to make contact, if any, in a region of the slider which does not have a substantial effect on the fly height. Thus, any contact caused wear simply increases the effective fly height of the lowest portion of the slider and thereby decreases the chance of future contact between the slider and the disk.

In the preferred embodiment, the slider utilizes a tapered center rail having a narrow tail which is closest to the disk and a pair of outside rails which are wider at the leading edge. The center rail tapers from a narrow leading edge to a wider support region and then tapers to a narrow trailing edge. The trailing edge is closest to the disk and provides virtually no contribution to aerodynamic support of the slider. Since the trailing edge does not contribute to the support of the slider, any contact induced wear can be tolerated without affecting the fly height. Even further, the wear characteristic is self-limiting. That is, after the initial wear has taken place, the likelihood of further wear is reduced. This is in sharp contrast to existing systems in which wear caused by contact between the disk and the slider causes the slider to fly at a lower height, which further accelerates wear and leads to rapid failure of the system.

BRIEF DESCRIPTION OF THE DRAWINGS

FIG. 6 is a side view of the center rail after the slider of FIG. 2 has been broken in;

DETAILED DESCRIPTION OF THE PREFERRED EMBODIMENT

Figure 1:
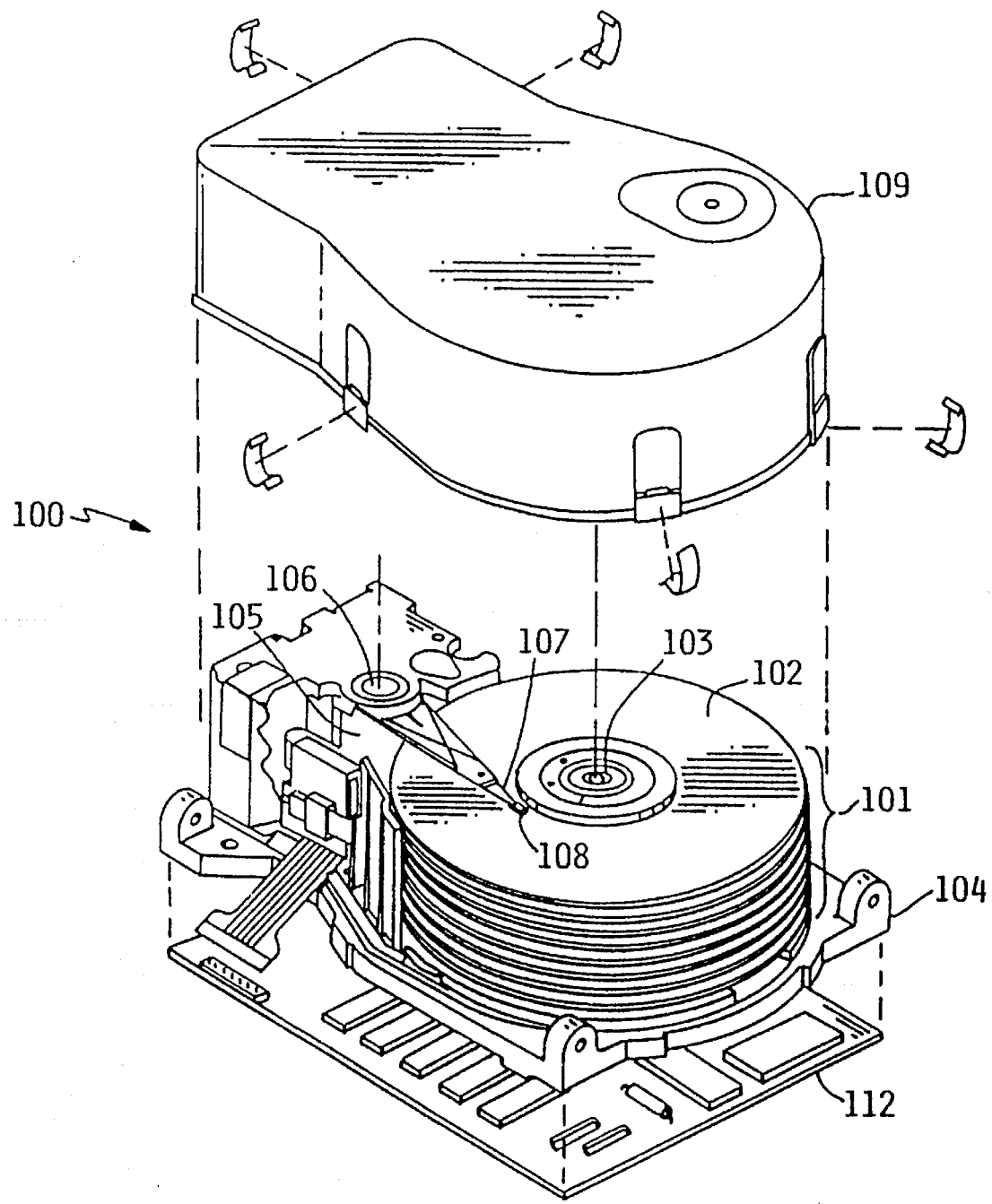
FIG. 1 shows a magnetic disk drive utilizing an air bearing slider in accordance with the present invention.

FIG. 1 shows a magnetic disk drive 100 utilizing an air bearing slider in accordance with the preferred embodiment of the present invention. A plurality of disks 101 having magnetic recording surfaces 102 are rigidly attached to common hub or spindle 103, which is mounted on base 104. Spindle 103 and disks 101 are driven by a drive motor (not visible) at a constant rotational velocity. Comb-like actuator assembly 105 is situated to one side of disks 101. Actuator 105 rotates through an arc about shaft 106 parallel to the axis of the spindle, driven by an electromagnet, to position the transducer heads. Cover 109 mates with base 104 to enclose and protect the disk and actuator assemblies. Electronic modules for controlling the operation of the drive and communicating with another device, such as a host computer, are contained in circuit card 112, typically mounted outside the enclosure. A plurality of head/suspension assemblies 107 are rigidly attached to the prongs of actuator 105, one head/suspension assembly 107 corresponding to each disk recording surface 102. Typically, data is recorded on both surfaces of the disk, making two opposed head/suspension assemblies for each disk. An aerodynamic transducer head 108 is located at the end of each head/suspension assembly 107 adjacent the disk surface. Head/suspension assembly 107 is essentially a beam spring tending to force transducer head 108 against the surface of the disk 102. The aerodynamic characteristics of the head 108 counteract the force of the beam spring, making the head 108 "fly" a small distance from the surface of the disk 101 due to air movement caused by the spinning disk 101.

Transducer head 108 is shown in greater detail in FIGS. 2–6. Head 108 comprises a transducing element mounted on an air bearing slider. The slider is a rectangular parallelepiped, having a plurality of rails formed on the surface facing the disk. The transducing element is mounted at the rear face of the slider.

Figure 2:
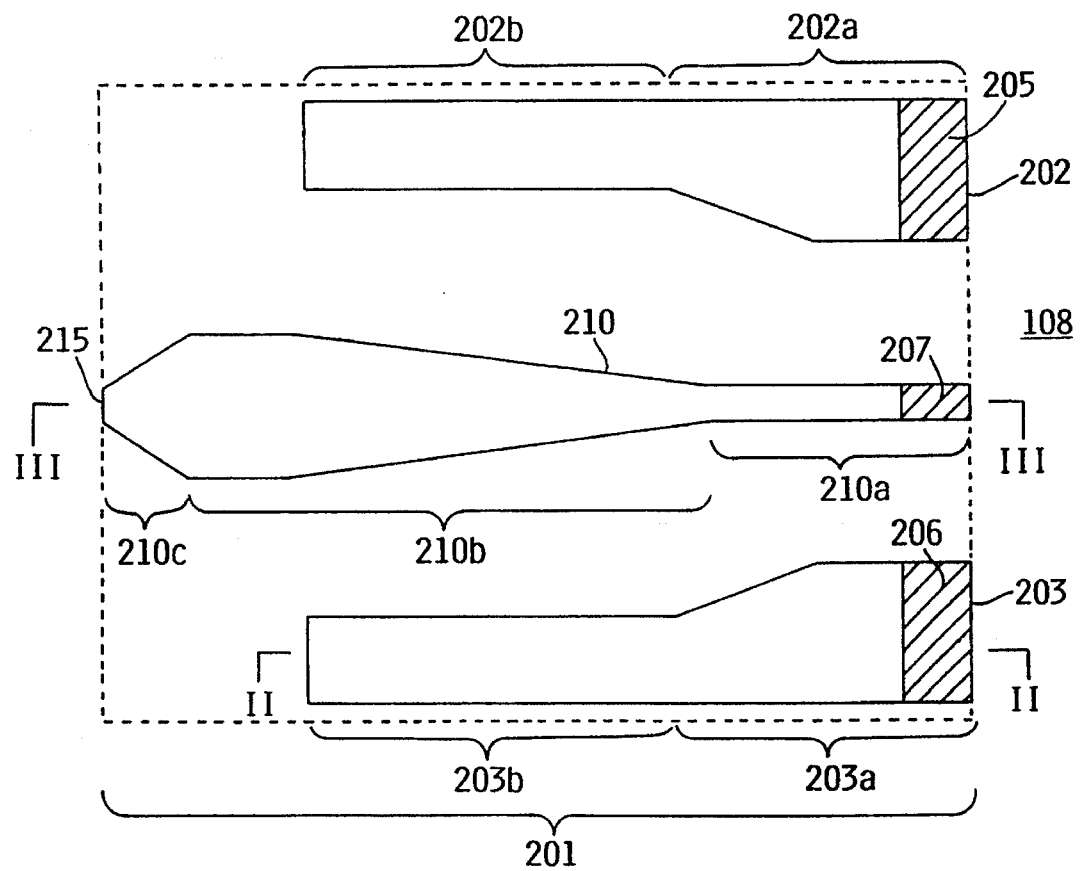
FIG. 2 is a bottom view a the three rail air bearing slider in accordance with the preferred embodiment of the present invention.

With reference to FIG. 2, slider 201 preferably has a pair of outer rails 202 and 203, which have wide front portions 202a and 203a, respectively, and narrow rear portions 202b and 203b, respectively. Rails 202 and 203 have chamfered portions 205 and 206, respectively, at the leading edges. Slider 201 has a center rail 210, positioned midway between side rails 202 and 203 and extending rearwardly therefrom. Center rail 210 has a narrow front portion 210a which includes chamfered leading edge 207, a wide rear portion 210b and a constricted tail portion 210c. The transducing element (transducer gap) 215 is positioned using thin film processes on the rear portion 210c of center rail 210.

Slider 201 can be fabricated using any of various conventional techniques as are known in the art. Slider 201 is preferably formed of N58 ceramic, although other suitable ceramic or non-ceramic materials may be used. The pattern for the rails is preferably formed using masks, photoresists and etching to cut the slider material between the rails down several micrometers from the air bearing surfaces of the rails. Alternatively, rails can be formed by grinding out the area between the rails.

Transducing element 215 is preferably a thin-film magnetic read/write element, which is fabricated using conventional thin-film fabrication techniques. Typically, a plurality of heads are fabricated by sputtering and/or plating onto a ceramic wafer that is the thickness of the length of slider 201. The wafer is then cut into individual sliders, the wafer thickness becoming the length of the slider, and the wafer surface becoming the rear surface of the slider. Such techniques are known in the art.

Figure 3:
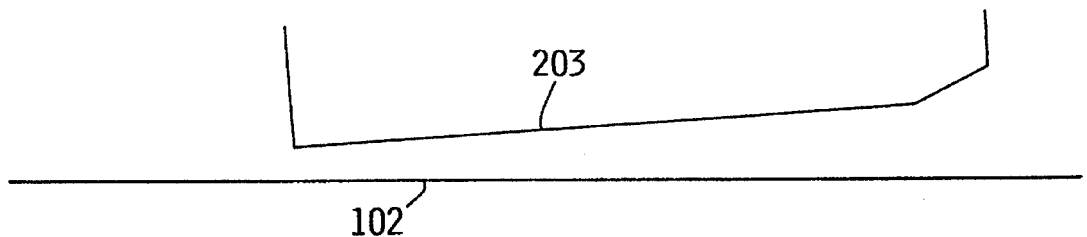
FIG. 3 is a sectional view of the slider taken through one of the side rails along the line II—II of FIG. 2.

FIGS. 3–6 show side and sectional views of slider 201, in which the height of the rails is exaggerated for clarity. The outer rails 202 and 203 of slider 201 fly above the disk surface as shown in FIG. 3. The nominal spacing from disk surface 102 is 2 to 3 microinches at the rear of the rail.

Figure 4:
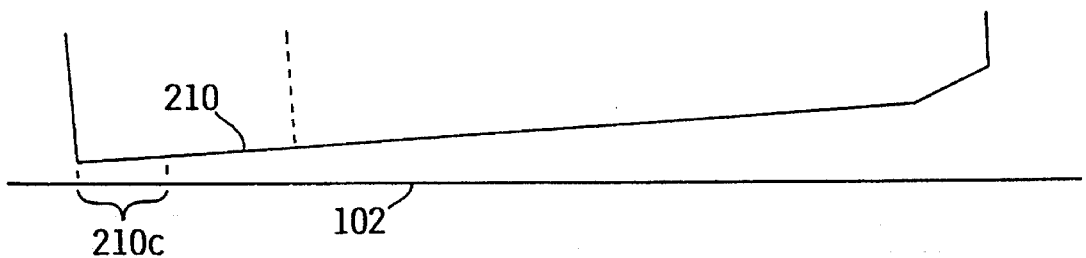
FIG. 4 is a sectional view of the slider taken through the center rail along the line III—III of FIG. 2.

FIG. 4 is a sectional view of the slider 201 taken through center rail 210 along the line III—III of FIG. 2. The bottom surface of center rail 210 is co-planar with the the bottom surfaces of side rails 202 and 203. Since center rail 210 extends further to the rear than either of side rails 202 or 203, the trailing end of center rail 210 is closer to the disk 102 than either of the side rails 202 or 203. Due to the upward pitch attitude at which the head 108 flies, any contact with disk 102 will occur at the rearmost portion 210c of center rail 210. Such contact will eventually wear the portion 210c of center rail 210 to a plane parallel to disk surface 102. However, since the region of contact does not contribute to the support of the slider 201 above the disk 102, such wear does not affect the fly height of the slider 201. The transducer gap 215 is located on the back edge of this wear region. However, since the total wear height is less than one microinch, it is small compared to the dimensions of the gap element 215.

Figure 5:
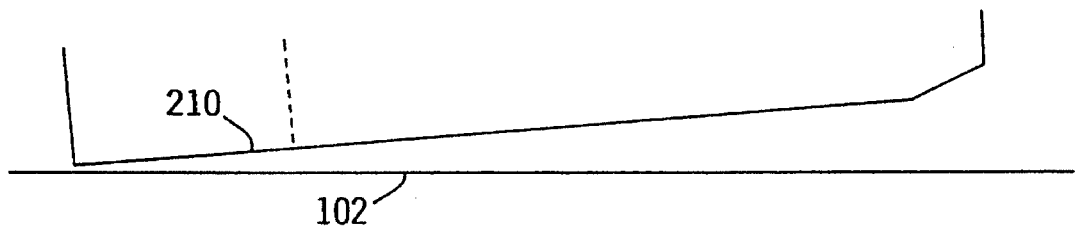
FIG. 5 is a side view of the center rail when the slider of FIG. 2 is first positioned over a hard disk surface.

The position and shape of center rail 210 when the slider 201 is first positioned over the disk 102 is shown in FIG. 5. To better illustrate the break-in process, the pitch angle has been exaggerated. It can be seen that the rearmost portion of center rail 210 is in actual contact with disk surface 102. In normal applications, the fly height will be selected so that the contact is only intermittent, and caused largely by asperities in the disk surface.

Figure 6:
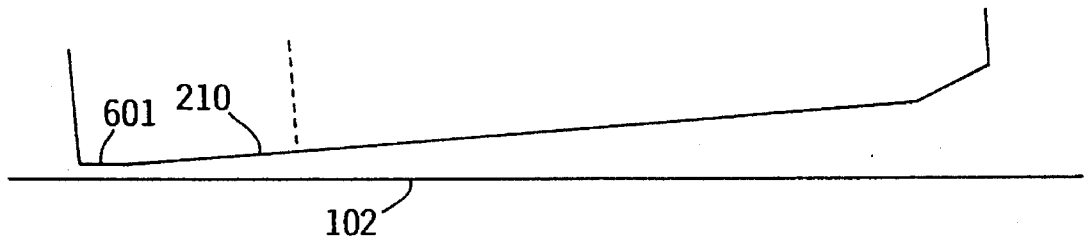

After the break-in period, the rearmost portion 601, shown in FIG. 6, of center rail 210 has worn to a surface parallel to the disk surface 102. The initial wear is very rapid and once it has occurred, there is very little further change in the geometry of center rail 210.

The highest pressure under the rails 202, 203, and 210 will occur near the widest point of the center rail 210. The pressure between center rail 210 and the disk surface 102 in region 210c will drop considerably due to leakage from the tapered sides. Thus the support for the slider 201 will be virtually independent of the position and pressure under this portion 210c of the center rail 210. If portion 210c is designed to be 1.5 microinches below the position where maximum pressure exists, there will be very little change in fly height even if 1.0 microinches is worn away. A typical fly height drop in a slider 201 according to the invention would be 0.1 microinch. In this case, the back 210c of the slider 201 would have a clearance of 0.9 microinch more than when initially installed.

While the operative principle of the present design could be applied to different sliders, slider 201 of the preferred embodiment is an application of this principle to the tri-rail slider described in U.S. Pat. No. 4,894,740 to Chhabra et al., herein incorporated by reference. The Chhabra tri-rail slider provides a reduced sensitivity to roll of the slider since, for moderate amounts of roll, the outer rails will not be lower than the back of the center rail. The remaining sensitivity is due to the remaining width of the back of the center rail, which determines how much lower one side of the rail is relative to the other for a given roll angle. With the constricted tail portion 210c of the center rail 210 as seen in FIG. 2, the roll sensitivity is further reduced compared to that of the unmodified Chhabra tri-rail. Additionally, after the initial wear, the surface will adapt to any residual static roll, so the adapted surface will be more nearly parallel to the disk surface 102.

The invention can be used in varying degrees. For example, if the rearmost portion of center rails 202, 203, and 210 is made just a slightly lower than the point where maximum pressure exists, only the sliders which, due to variations within tolerance, fly slightly low would make contact with the disk. In this configuration, the sliders which fly at the specified height or slightly above would not make contact with the disk. Only those heads which perform the best, due to their exceptional closeness to the disk, would be affected since these would be flying at heights lower than the asperities. When the invention is used in this fashion, the high and nominal fly heights can be lowered without a substantial effect on the minimum fly height, which would be adapted toward the nominal value by the wear caused during a break-in period. In this situation, there would be little impact on file error rates during the break-in period since only the best performing heads are affected.

Full benefit of the invention is obtained by designing the heads so that all heads contact the disk during the break-in period. This provides the minimum head disk spacing for all heads and provides the best ultimate performance. In this case, all heads will perform well as they all adapt to the lowest possible height at the read/write element.

In a disk storage system having a disk coating which is less prone to wear than the slider rails, it would be possible to eliminate or substantially reduce the amount of lubricant required on the disk. The absence of lubricant prevents the binding of debris to the surface of the disk and allows the circulating air to carry the debris to the filter for removal.

It will be appreciated that the start/stop performance of the system will still involve head contact with the disk and some wear inevitably results from any such contact. However, with the wear at the back of the head caused by contact with occasional peaks in the flying mode, the tipping point on the slider for initial take off is moved forward and thus requires less lift on the front due to initial pick-up, which then acts to "grab more air". The wear around this tipping point will be higher as a result, causing a blending of the normal flat bottom and the wear area, leading to a somewhat crowned center rail. The blending of the tipping point effectively created a tipping point even further forward.

Figure 7:
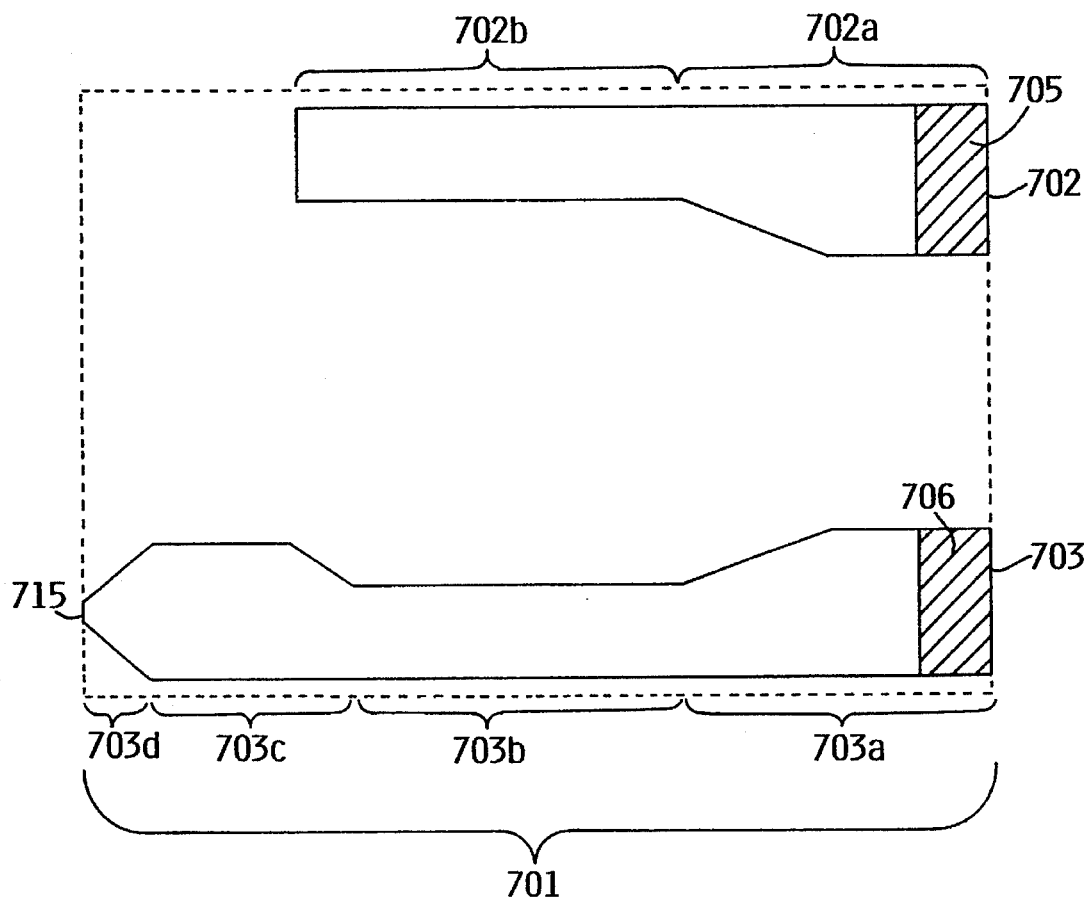
FIG. 7 is a bottom view a two rail air bearing slider in accordance with an alternative embodiment of the present invention.

In the preferred embodiment described above, slider 201 contains three rails, the transducing element 215 being located at the rear of the center rail 210. However, in an alternative embodiment the present invention can also be applied to slider designs having only two side rails, where the transducer is along one of the side rails. FIG. 7 shows a bottom view of such a slider according to this alternative embodiment. Slider 701 comprises side rails 702 and 703, which are asymmetrical. Each rail 702,703 has a corresponding chamfered leading edge 705,706. Both rails 702, 703 contain respective wide leading portions 702a,703a and narrower middle portions 702b,703b. Rail 703 additionally contains a widened rear portion 703c, and a tapered tail portion 703d. The transducer element 715 is located on the rear face of slider 701 at the end of tail portion 703d. Tail portion 703d wears in a manner similar to tail portion 210c of slider 201 of the preferred embodiment.

Figure 8:
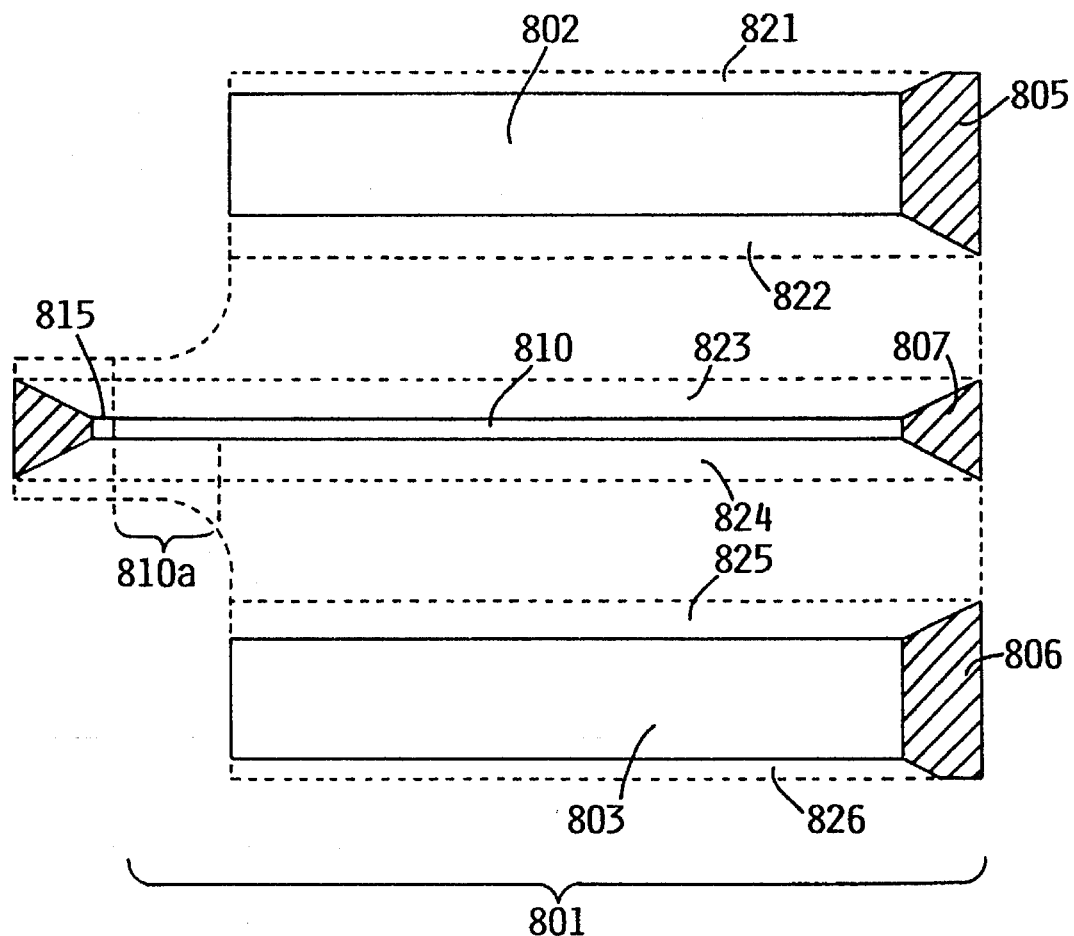
FIG. 8 is a bottom view a three rail air bearing slider in accordance with another alternative embodiment of the present invention.

Another alternative embodiment of the present invention is shown in FIG. 8. In this embodiment, slider 801 comprises symmetrical side rails 802 and 803, and center rail 810. Transducer 815 is located at the trailing edge of center rail 810. Rails 802,803,810 not only contain chamfered leading edges 805,806,807, respectively, but chamfered side edges 821–826 as well. Because side rails 802,803 are significantly wider than center rail 810, nearly all the aerodynamic support is provided by side rails 802,803. Center rail 810 includes a tail portion 810a extending beyond the trailing edges of side rails 802,803. Portion 810a wears in a manner similar to tail portions 210c of slider 201 and 703d of slider 701. The alternative shown in FIG. 8 may be particularly useful where transducer 815 is a ferrite type transducer.

In the preferred embodiment transducer 215 is a thin-film magnetic read/write transducer, as is known in the art. However, the air-bearing slider of the present invention could be used with any of various different transducer technologies. For example, transducer 215 could be a ferrite transducer. It is also possible that read and write functions be performed by separate transducing elements, as for example a thin-film write transducer and a magneto-resistive read transducer. It should be understood that these examples are illustrative only, and the slider of the present invention could be used with transducer technologies not mentioned.

Although a specific embodiment of the invention has been disclosed along with certain alternatives, it will be recognized by those skilled in the art that additional variations in form and detail may be made within the scope of the following claims.

What is claimed is:

1. An air bearing slider assembly comprising:

a plurality of separated elongated rails, each rail extending in a direction parallel to a longitudinal axis of the slider assembly, each rail having a leading edge at an air inflow end of the slider assembly and a trailing edge, a first rail of the plurality of elongated rails having a load bearing portion between the leading edge and the trailing edge and a constricted tail portion at the trailing edge, said tail portion being narrower than said load bearing portion, a second elongated rail of the plurality of elongated rails being positioned on one side of the first rail, the trailing edge of said first rail being positioned further away from the air inflow end of the slider assembly than the trailing edge of said second rail; and a transducer element mounted on the first rail constricted tail portion.

2. The air bearing slider of claim 1 wherein the plurality of elongated rails further comprises a third elongated rail, said second and third rails being located along opposite sides of said slider and having said first rail disposed therebetween.

3. The air bearing slider of claim 2 wherein said second and third rails each comprise relatively wide front portions tapering to narrow rear portions.

4. The air bearing slider of claim 2 wherein said first, second and third rails each comprise chamfers at the leading edges thereof.

5. The air bearing slider of claim 1 wherein said first rail comprises a relatively narrow front portion at the leading edge tapering outward to said load bearing portion, said load bearing portion being relatively wider than said front portion.

6. The air bearing slider of claim 1 wherein said first and second elongated rails are located along opposite sides of said slider.

7. A disk drive storage device, comprising:
   (a) a base for mounting components of said disk drive;
   (b) at least one disk mounted to said base for rotation about an axis, said disk having a disk surface for storing data;
   (c) a movable actuator assembly mounted to said base for positioning a transducer to access data recorded on said disk surface, said actuator including a suspension arm and an air bearing slider assembly attached to said suspension arm, said air bearing slider assembly comprising:
      (i) a plurality of separated elongated rails, each rail extending in a direction parallel to a longitudinal axis of the slider assembly, each rail having a leading edge at an air inflow end of the slider assembly and a trailing edge, a first rail of the plurality of elongated rails having a load bearing portion between the leading edge and the trailing edge and a constricted tail portion at the trailing edge, said tail portion being narrower than said load bearing portion, a second elongated rail of the plurality of elongated rails being positioned on one side of the first rail, the trailing edge of said first rail being positioned further away from the air inflow end of the slider assembly than the trailing edge of said second rail; and
      (ii) a transducer element mounted on the first rail constricted tail portion.

8. The disk drive storage device of claim 7 wherein the plurality of elongated rails further comprises a third elongated rail, said second and third rails being located along opposite sides of said slider and having said first rail disposed therebetween.

9. The disk drive storage device of claim 8 wherein said second and third rails each comprise relatively wide front portions tapering to narrow rear portions.

10. The disk drive storage device of claim 8 wherein said first, second and third rails each comprise chamfers at the leading edges thereof.

11. The disk drive storage device of claim 7 wherein said first rail comprises a relatively narrow front portion at the leading edge tapering outward to said load bearing portion, said load bearing portion being relatively wider than said front portion.

12. The disk drive storage device of claim 7 wherein said first and second elongated rails are located along opposite sides of said slider.

13. A disk drive storage device, comprising:
   (a) a base for mounting components of said disk drive;
   (b) at least one disk mounted to said base for rotation about an axis, said disk having a disk surface for storing data;
   (c) a movable actuator assembly mounted to said base for positioning a transducer to access data recorded on said disk surface, said actuator including a suspension arm and an air bearing slider assembly attached to said suspension arm, said air bearing slider assembly comprising:
      (i) a plurality of separated elongated rails, each rail extending in a direction parallel to a longitudinal axis of the slider assembly, each rail having a leading edge at an air inflow end of the slider assembly and a trailing edge, one rail of the plurality of elongated rails having a constricted tail portion at the trailing edge, the plurality of elongated rails collectively forming an aerodynamic load bearing section of said slider, said load bearing section being located between the constricted tail portion and the leading edge of the first rail such that the trailing edge of other rails of the plurality of elongated rails are closer to the air inflow end of the slider assembly than the constricted tail portion; and
      (ii) a transducer element mounted on the constricted tail portion.

* * * * *